(12) United States Patent
Zhang et al.

(10) Patent No.: US 8,006,346 B2
(45) Date of Patent: Aug. 30, 2011

(54) AUTOMATICALLY OPENING HINGE ASSEMBLY FOR PORTABLE ELECTRONIC DEVICES

(75) Inventors: Yu Zhang, Shenzhen (CN); Shui-Jin Dong, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 403 days.

(21) Appl. No.: 12/334,628

(22) Filed: Dec. 15, 2008

(65) Prior Publication Data

US 2010/0050384 A1 Mar. 4, 2010

(30) Foreign Application Priority Data

Aug. 29, 2008 (CN) ...................... 2008 1 0304294.1

(51) Int. Cl.
*E05F 1/08* (2006.01)
(52) U.S. Cl. ................ 16/303; 16/330; 16/341
(58) Field of Classification Search ............ 16/303, 16/330, 312, 316, 297, 338, 339, 340, 341, 16/342, 277, 324, 325, 326, 327, 328; 379/433.11, 379/433.12, 433.13
See application file for complete search history.

(56) References Cited

U.S. PATENT DOCUMENTS

| 6,886,221 | B2 * | 5/2005 | Minami et al. ................... 16/324 |
| 7,151,226 | B2 * | 12/2006 | Minami et al. ............. 174/161 R |
| 7,434,296 | B2 * | 10/2008 | Kubota ........................... 16/330 |
| 7,818,845 | B2 * | 10/2010 | Hu et al. ......................... 16/330 |
| 7,895,710 | B2 * | 3/2011 | Takagi et al. ................... 16/330 |
| 2003/0153284 | A1 * | 8/2003 | Minami et al. ................... 455/90 |
| 2004/0052058 | A1 * | 3/2004 | Minami et al. ................ 361/724 |
| 2004/0224730 | A1 * | 11/2004 | Sakai et al. ................ 455/575.3 |
| 2005/0220294 | A1 * | 10/2005 | Gupte ....................... 379/433.13 |
| 2006/0080805 | A1 * | 4/2006 | Takagi ............................ 16/326 |
| 2006/0174443 | A1 * | 8/2006 | Takagi et al. ................... 16/330 |
| 2009/0100641 | A1 * | 4/2009 | Yang ............................... 16/303 |

* cited by examiner

*Primary Examiner* — Victor Batson
*Assistant Examiner* — Jeffrey O Brien
(74) *Attorney, Agent, or Firm* — Altis Law Group, Inc.

(57) ABSTRACT

A hinge assembly includes a cam (13), a follower (14), a first spring (12), a control member (17) and a second spring (16). The cam has a first cam surface (135) and a second cam surface (136). The follower has a third cam surface (141) engaging with the first cam surface. The first spring provides an elastic force causing the cam surface of the cam and the third cam surface of the follower to resist each other. The control member has a fourth cam surface engaging with the second cam surface of the cam. The second spring is positioned between the control member and the follower. The control member is movable to push the cam to rotate to realize the first cam surface of the cam to rotate relative to the third cam surface of the follower.

16 Claims, 9 Drawing Sheets

US 8,006,346 B2

AUTOMATICALLY OPENING HINGE ASSEMBLY FOR PORTABLE ELECTRONIC DEVICES

BACKGROUND OF THE INVENTION

1. Field of the Invention

The present invention relates to hinge assemblies and, particularly, to an automatically opening hinge assembly for foldable devices such as portable telephones, portable computers, and so on.

2. Discussion of the Related Art

At present, perhaps the most popular portable electronic device in the marketplace is the foldable cellular telephone, which generally includes a cover section and a body section. The cover section and the body section are rotatably interconnected through a hinge assembly, for switching the telephone between an in-use position and a closed position.

One kind of hinge assembly employs a cam and a follower, which allows the cover section to fold outwards from the body section and then be held in an open position. The hinge assembly typically includes a cam having a concave portion, a follower having a convex portion, a shaft having a fixing end, and a spring. The cam and the follower are placed around the shaft. The spring resists the follower to make the concave portion tightly contact the convex portion. The cam, the follower, the shaft and the spring are received in a housing. A flip cover rotates about a main body of the mobile phone by overcoming the force of the spring, thus allowing the concave portion to rotate about the convex portion. However, a user must typically open the mobile phone using both hands. This makes the mobile phone awkward to use in situations when the user has only one hand free.

Therefore, there is a room for improvement within the art.

BRIEF DESCRIPTION OF THE DRAWINGS

Many aspects of the hinge assembly can be better understood with reference to the following drawings. The components in the drawings are not necessarily to scale, the emphasis instead being placed upon clearly illustrating the principles of the present hinge assembly. Moreover, in the drawings, like reference numerals designate corresponding parts throughout the several views, in which.

DETAILED DESCRIPTION OF THE EMBODIMENTS

Figure 1:
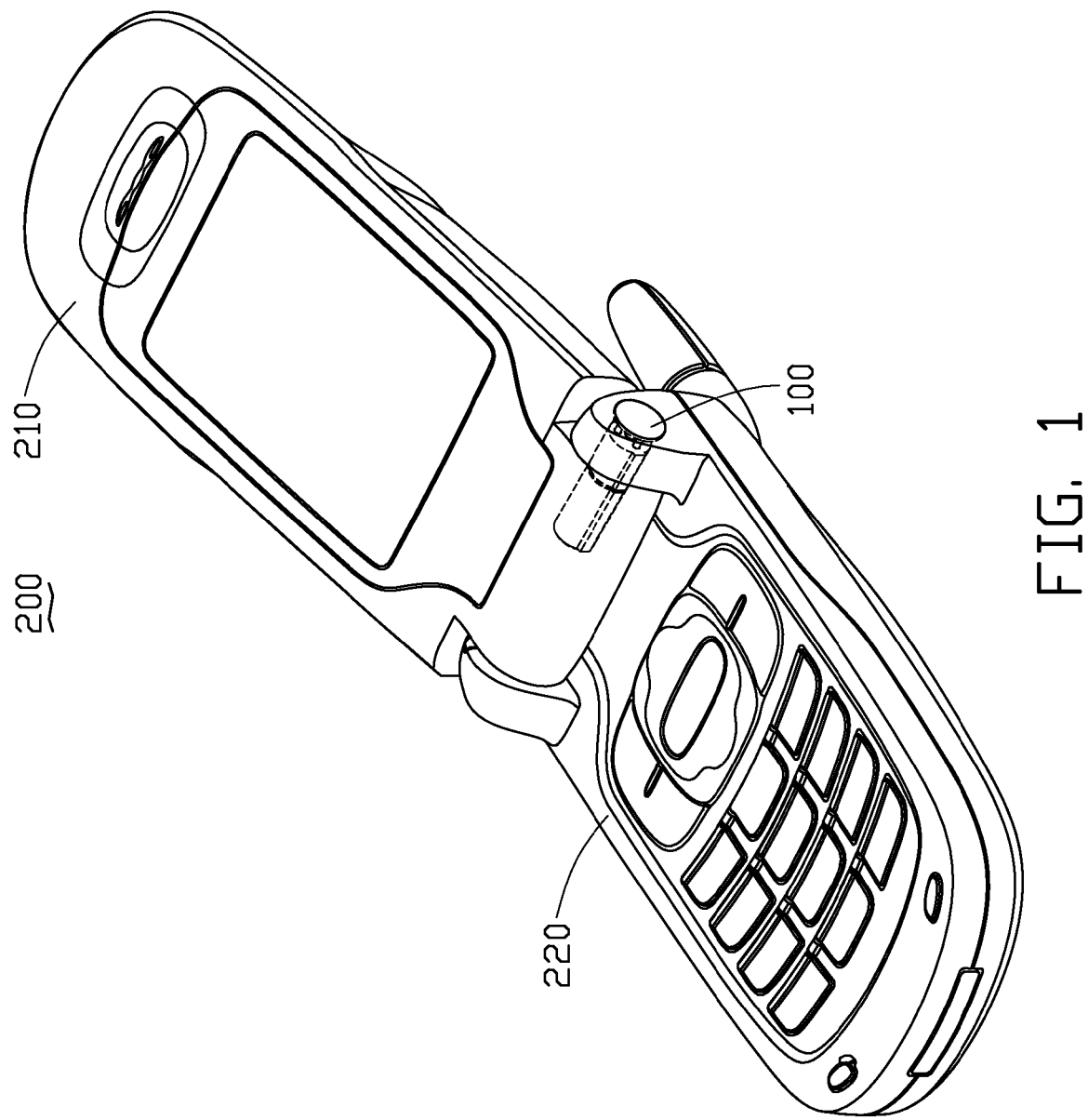
FIG. 1 is an isometric view of an exemplary embodiment of the present hinge assembly, as used in a mobile phone.

Referring now to the drawings in detail, FIG. 1 shows a hinge assembly 100, applied to a foldable electronic device 200 such as a flip type mobile phone, for pivotably coupling a cover section 210 and a body section 220. It is to be understood, however, that the hinge assembly 100 could be advantageously used in other environments (e.g. cabinet doors). As such, although proving particularly advantageous when used in foldable electronic devices, the hinge assembly 100 should not be considered limited in scope solely to foldable electronic devices.

Figure 2:
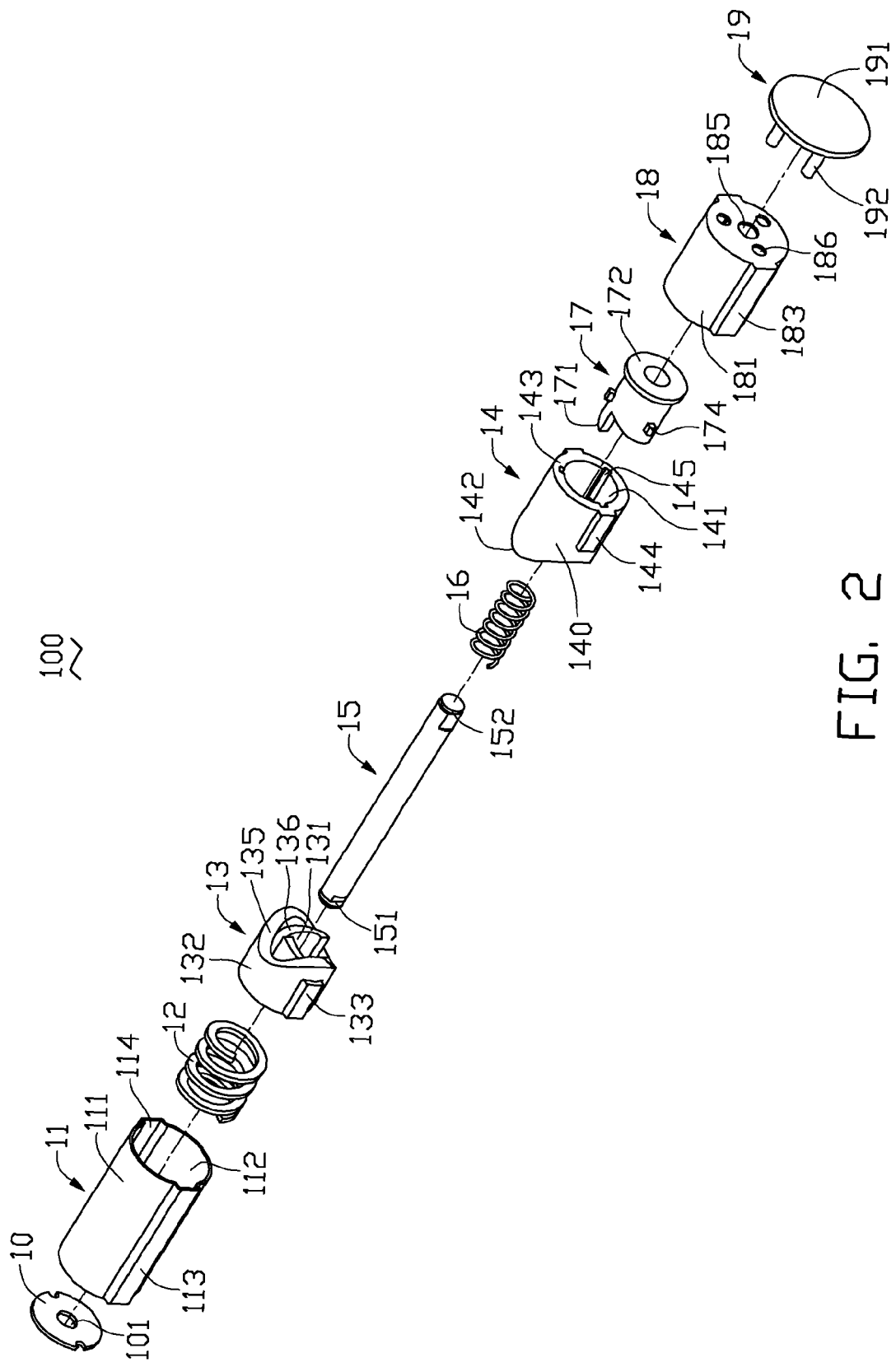
FIG. 2 is an exploded, isometric view of the exemplary embodiment of the hinge assembly shown in FIG. 1.
Figure 3:
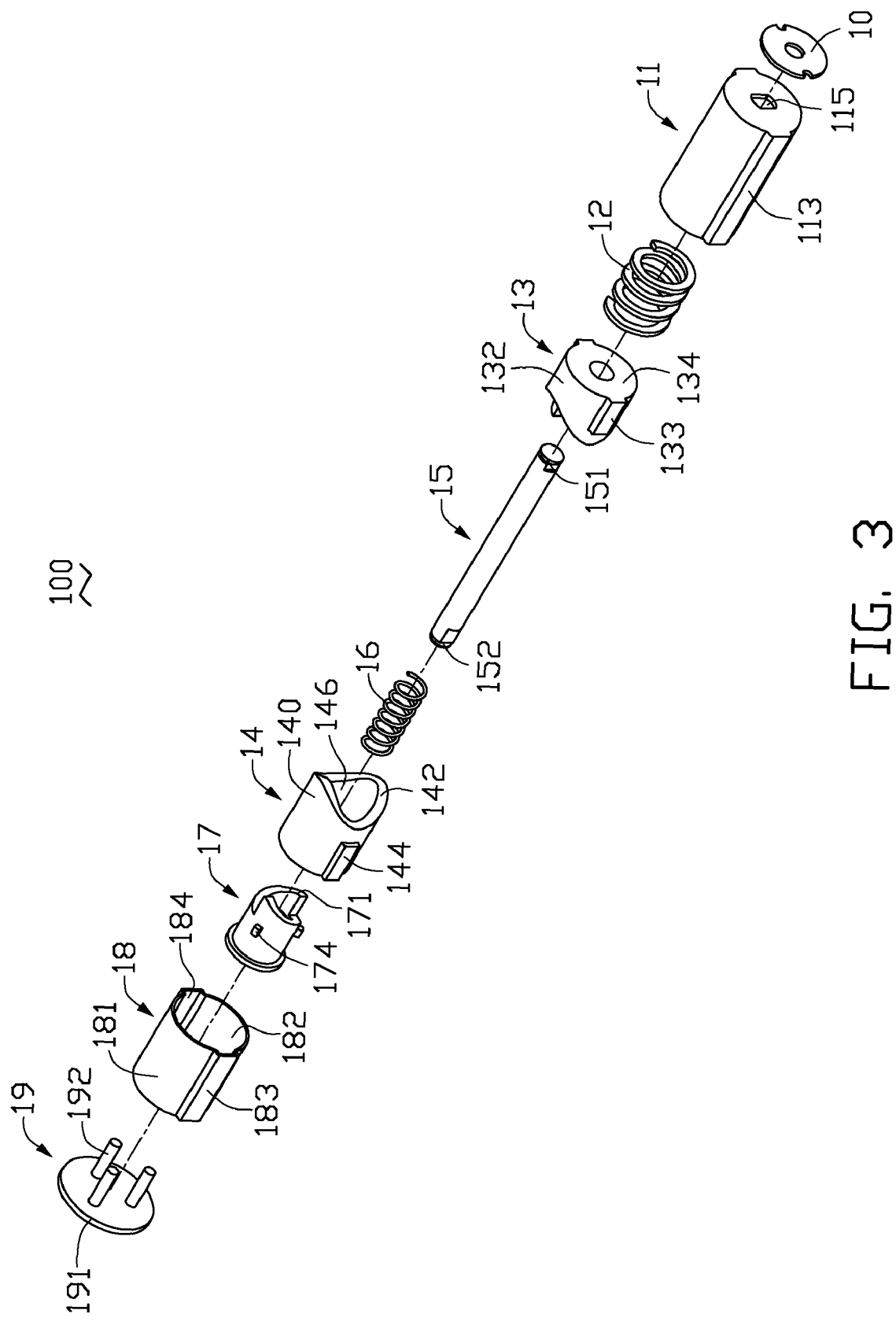
FIG. 3 is similar to FIG. 2, but viewed from another aspect.

Referring to FIGS. 2 and 3, the hinge assembly 100 in the embodiment illustrated includes a washer 10, a sleeve 11, a first spring 12, a cam 13, a follower 14, a shaft 15, a second spring 16, a control member 17, a receiving seat 18, and a button 19. The first spring 12 and the cam 13 surround the shaft 15 at one end. The follower 14, the second spring 16, and the control member 17, in that order, are placed on top of the other around an end of the shaft 15 opposite to the cam 13. The sleeve 11 receives the elements from one end of the first spring 12, and the receiving seat 18 receives the elements from one end of the control member 17. The washer 10 is fixed on the end of the shaft 15 with the cam 13, and the button 19 is further received in the receiving seat 18. Accordingly, the hinge assembly 100 is thus an integrated assembly.

The washer 10 is substantially disk-shaped, and may defines a circular/round hole 101 in a central area thereof.

The sleeve 11 is a substantially hollow cylinder having an outer wall 111 and an inner wall 112. The inner wall 112 is recessed toward the outer wall 111 to form two symmetrical sleeve blocks 113. Correspondingly, two sleeve grooves 114 are defined in the inner wall 112. The sleeve blocks 113 of the sleeve 11 may engage with the cover section 210 of the mobile phone 200 so that the sleeve 11 and the cover section 210 cannot rotate relative to each other. The sleeve 11 includes an open end and a partially-closed end. The partially-closed end of the sleeve 11 defines a square hole 115 at a central area thereof.

The first spring 12 is a cylindrical helical spring (i.e., occupying a cylindrical volume). An outer diameter of the first spring 12 is smaller than a size of the inner wall 112 of the sleeve 11 so that the first spring 12 may be received in the sleeve 11.

Figure 4:
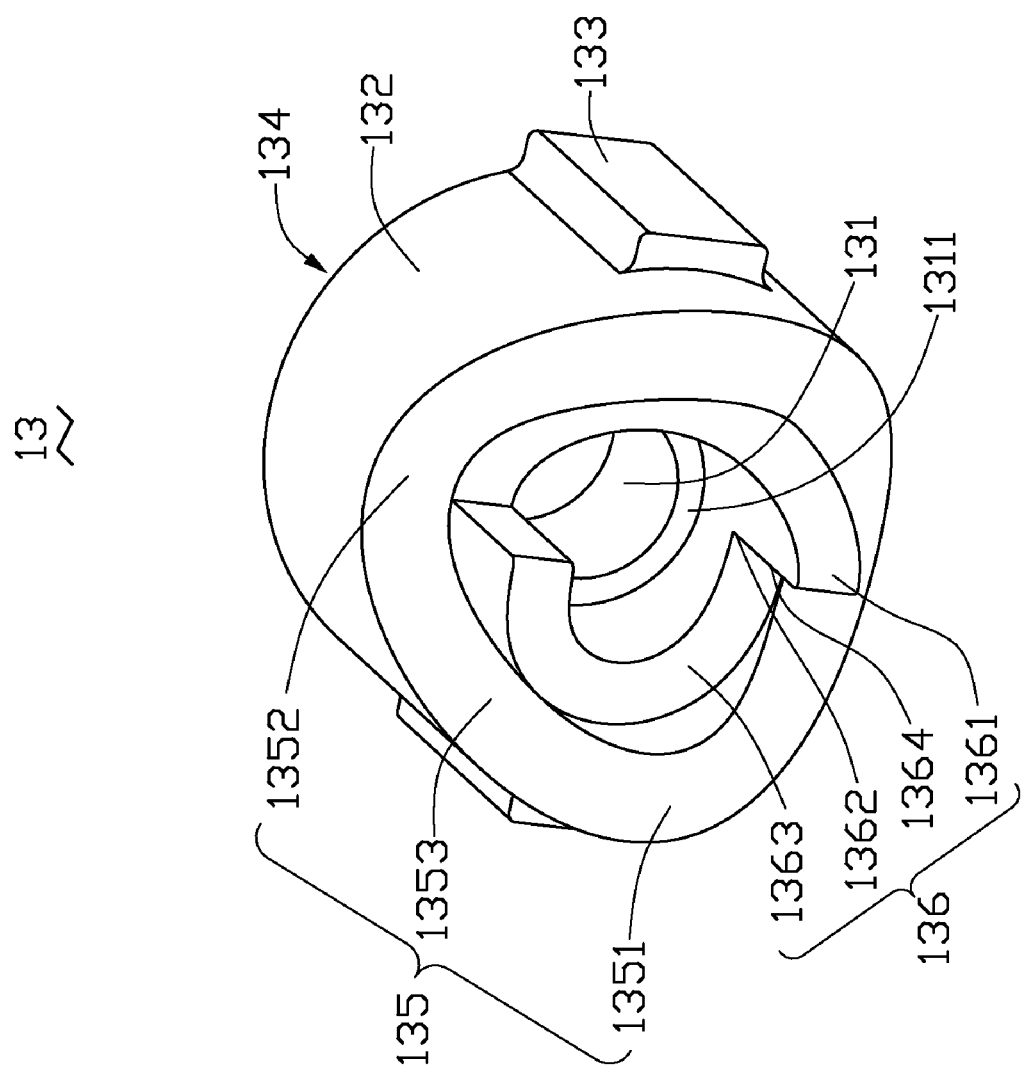
FIG. 4 is an enlarged view of the cam in FIG. 2.

Referring to FIG. 4, the cam 13 is substantially cylindrical in shape, and has a peripheral wall 132. The outer diameter of the peripheral wall 132 matches the inner diameter of the sleeve 11. The peripheral wall 132 forms two protrusions 133 for engaging in the sleeve grooves 114 of the sleeve 11 so the cam 13 may be non-rotatably received in the sleeve 11. The cam 13 defines a stepped hole 131. The stepped hole 131 has a larger diameter at one end thereof, and a smaller diameter at an opposite end thereof, thereby forming a stepped wall 1311. One end of the cam 13 has an end surface 134, and the other end of the cam 13 has a first cam surface 135 and a second cam surface 136. The second cam surface 136 is disposed at an inner side of the first cam surface 135. The first cam surface 135 includes two symmetrical peaks 1351, two symmetrical valleys 1352, and four sloped surfaces 1353 therebetween. The second cam surface 136 includes two symmetrical peaks 1361, two symmetrical valleys 1362, two sloped surfaces 1363 and two vertical surfaces 1364 connected to each other between one peak 1361 and one valley 1362.

Figure 5:
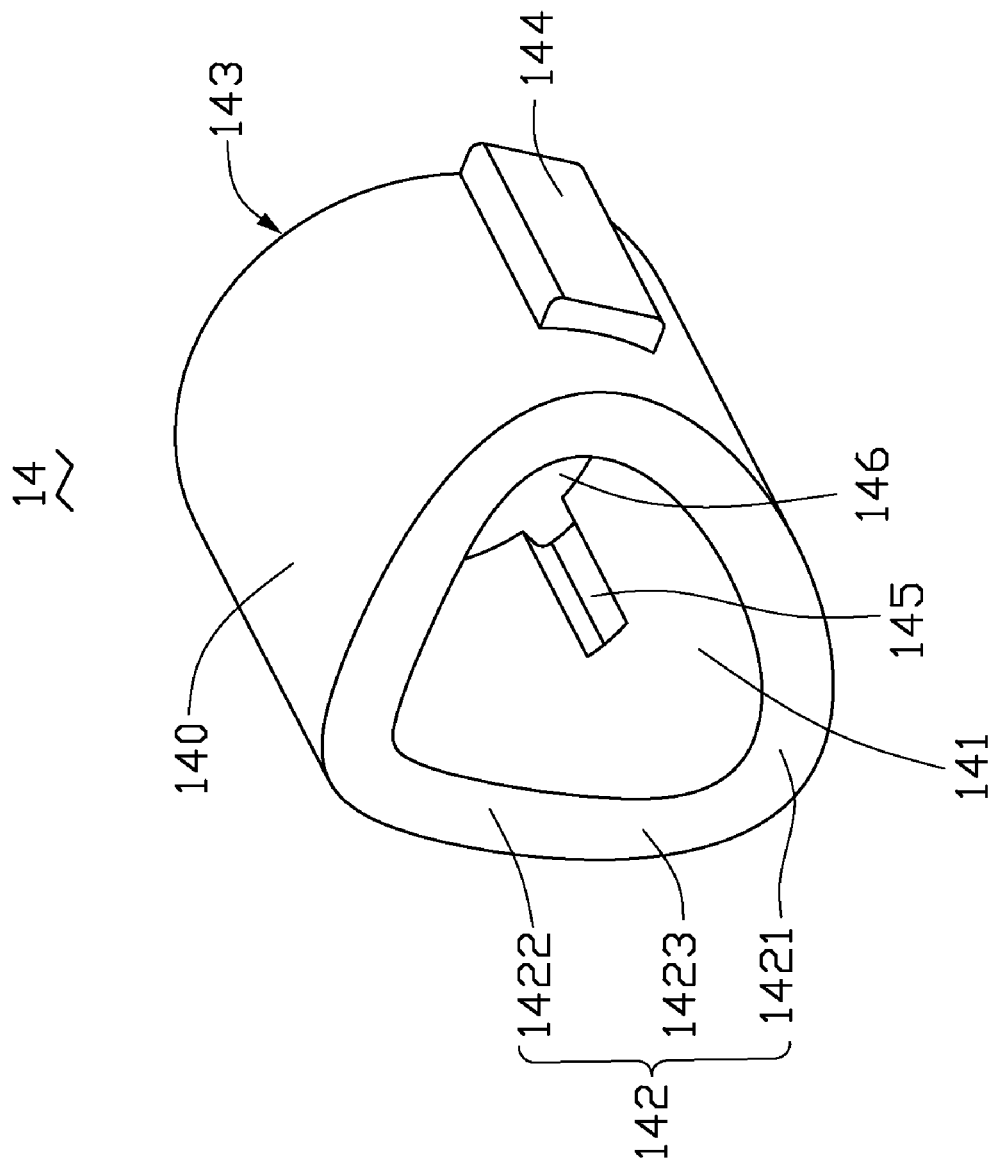
FIG. 5 is an enlarged view of the follower in FIG. 2.

Referring also to FIG. 5, the follower 14 is substantially a cylinder, and includes a cylindrical circumferential wall 140 and an inner circumferential wall 141. The outer circumferential wall 140 forms two projections 144. One end of the follower 14 has a third cam surface 142, the other end thereof has an end surface 143. The third cam surface 142 includes two symmetrical peaks 1421, two symmetrical valleys 1422, and four sloped surfaces 1423 for engaging with the first cam surface 135 of the cam 13. The follower 14 defines a through hole 146 surrounded by the inner circumferential wall 141. The inner circumferential wall 141 equally defines three spaced slots 145 along an axial direction thereof.

The shaft 15 is cylindrical in shape, and defines a loop groove 151 at one end thereof. The other end of the shaft 15 forms a latching portion 152.

The second spring 16 is substantially cylindrical. A diameter of the second spring 16 is larger than the diameter of the shaft 15 so that the second spring 16 may be placed around the shaft 15. One end of the second spring 16 resists the stepped wall 1311 of the cam 13.

Figure 6:
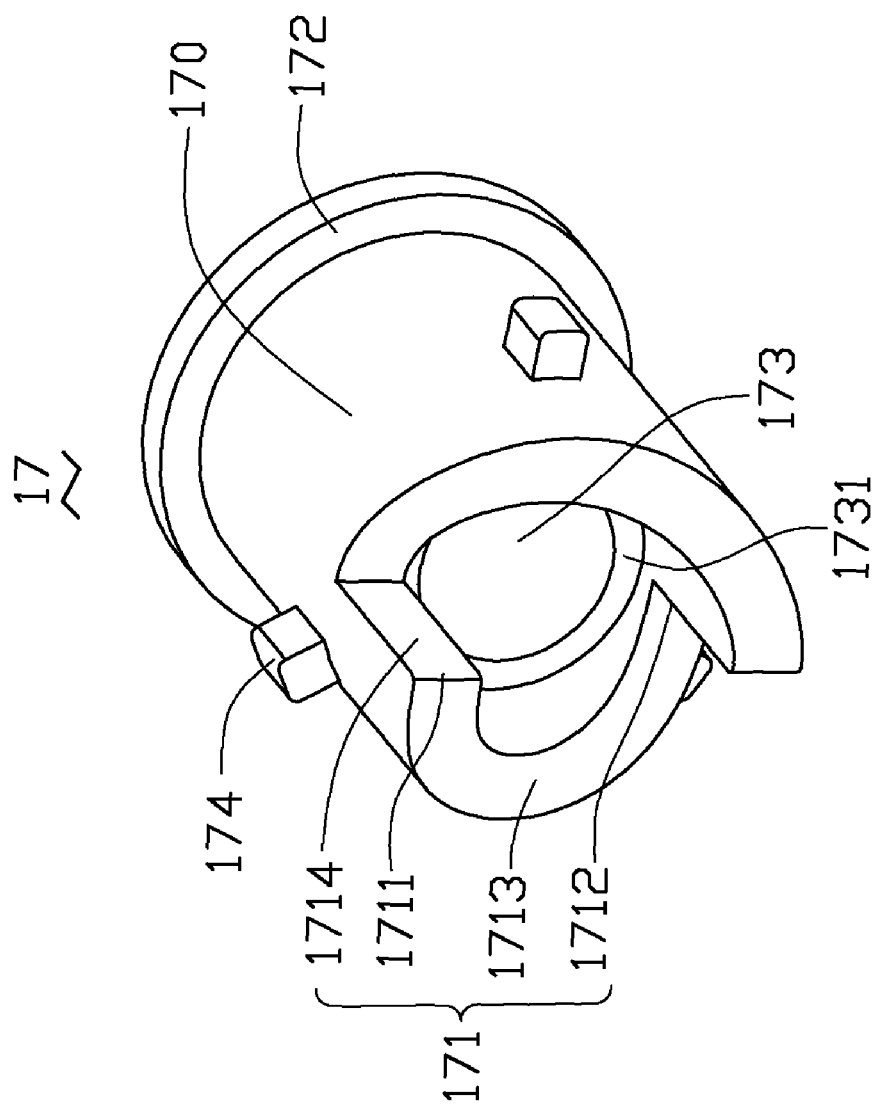
FIG. 6 is an enlarged view of the control member in FIG. 2.

Referring to FIG. 6, the control member 17 is a substantially hollow cylinder, and includes a body 170 and a flange 172 integrally formed together. The body 170 may be received in the through hole 146 of the follower 14, and has a fourth cam surface 171 opposite to the flange 172. The fourth cam surface 171 includes two symmetrical peaks 1711, two symmetrical valleys 1712, two sloped surfaces 1713 and two vertical surfaces 1714 connected to each other between one peak 1711 and one valley 1712. The control member 17 defines a stepped hole 173, thereby forming a stepped wall 1731. The other end of the second spring 16 may be received in the stepped hole 173, and resist the stepped wall 1731. The body 170 forms three spaced positioning blocks 174 at a peripheral wall thereof for engaging in a corresponding slot 145 of the follower 14. A diameter of the flange 172 is larger than the outer diameter of the follower 14 so that the flange 172 may resist the end wall 143 of the follower 14.

The receiving seat 18 is substantially cylindrical in shape, and includes an open end and a partially-closed end. The receiving seat 18 has an outer wall 181 and an inner wall 182. The inner wall 182 is recessed toward the outer wall 181 to form two symmetrical seat blocks 183. Correspondingly, two seat grooves 184 are defined in the inner wall 182. The seat blocks 183 of the receiving seat 18 may engage with the body section 220 of the mobile phone 200 so that the receiving seat 18 and the body section 220 cannot rotate relative to each other. The partially-closed end of the receiving seat 18 has a central hole 185 and three button holes 186. The central hole 185 receives the latching portion 152 of the shaft 15. The three button holes 186 surround the central hole 185.

The button 19 includes a disk-shaped board body 191, and three arms 192 extending from one end of the board body 191. Each arm 192 of the button 19 may be received in a corresponding button hole 186.

Figure 7:
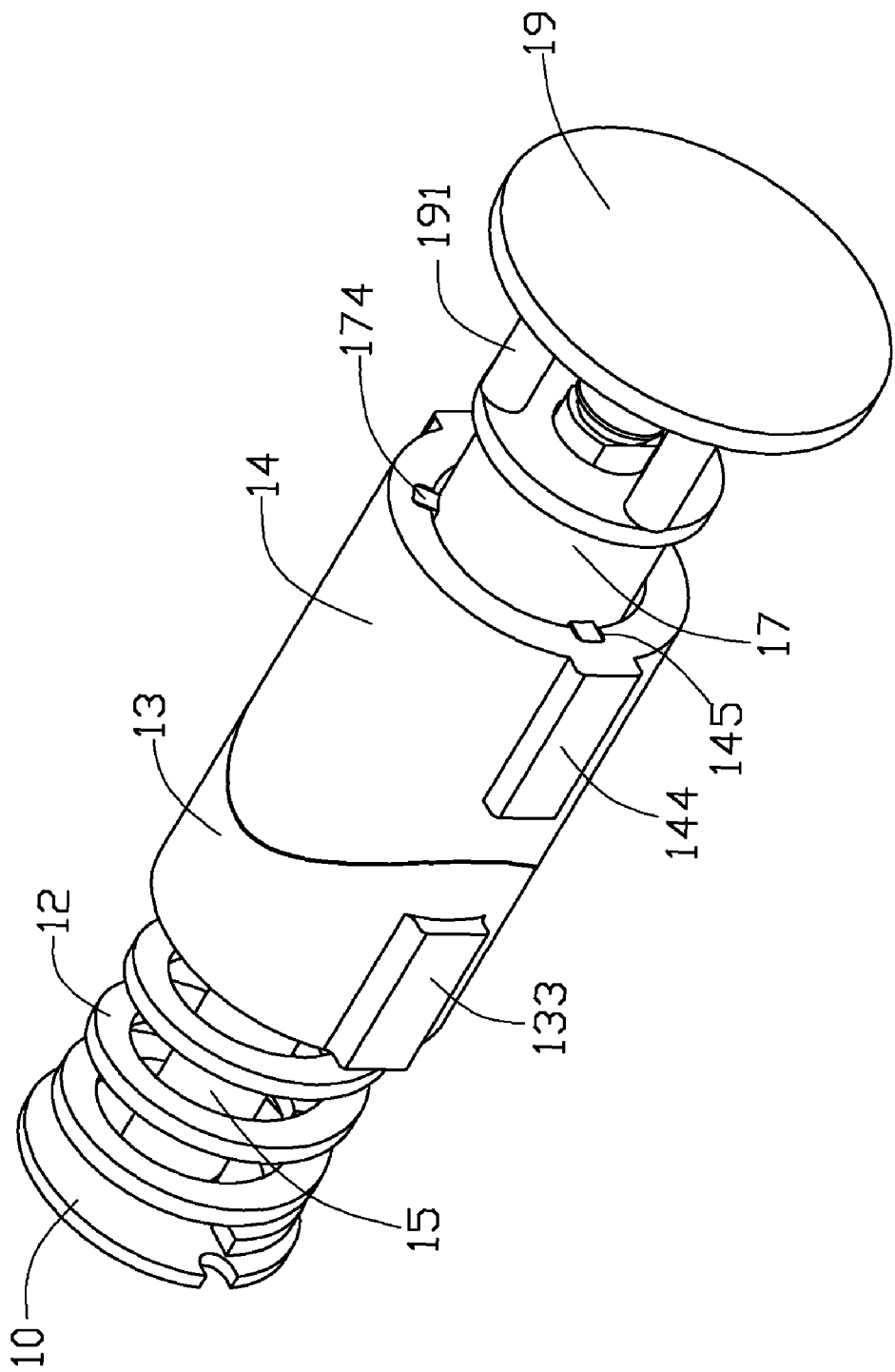
FIG. 7 is a partially assembled view showing the hinge assembly without the sleeve and the receiving seat in FIG. 2.
Figure 8:
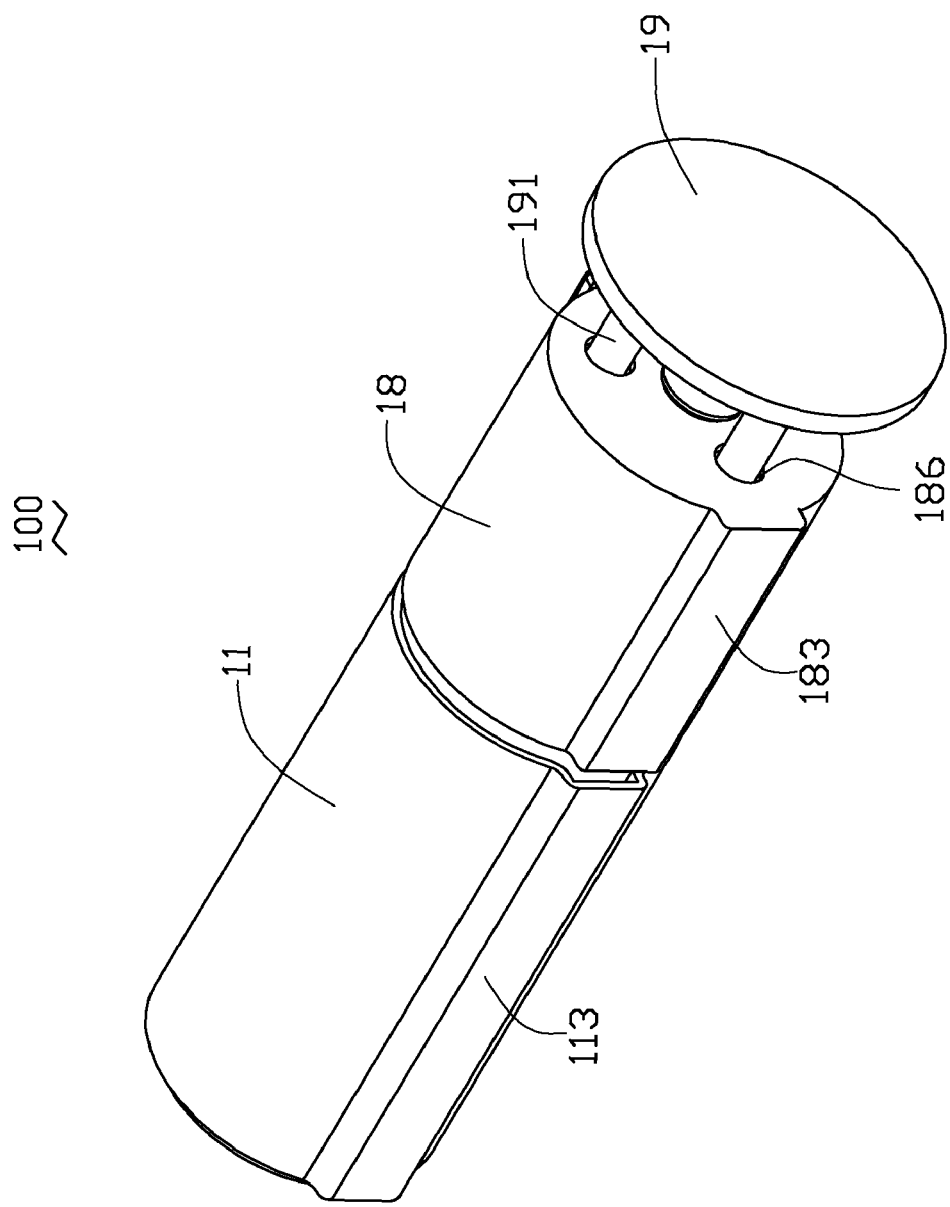
FIG. 8 is an assembled view showing the hinge assembly in FIG. 2.
Figure 9:
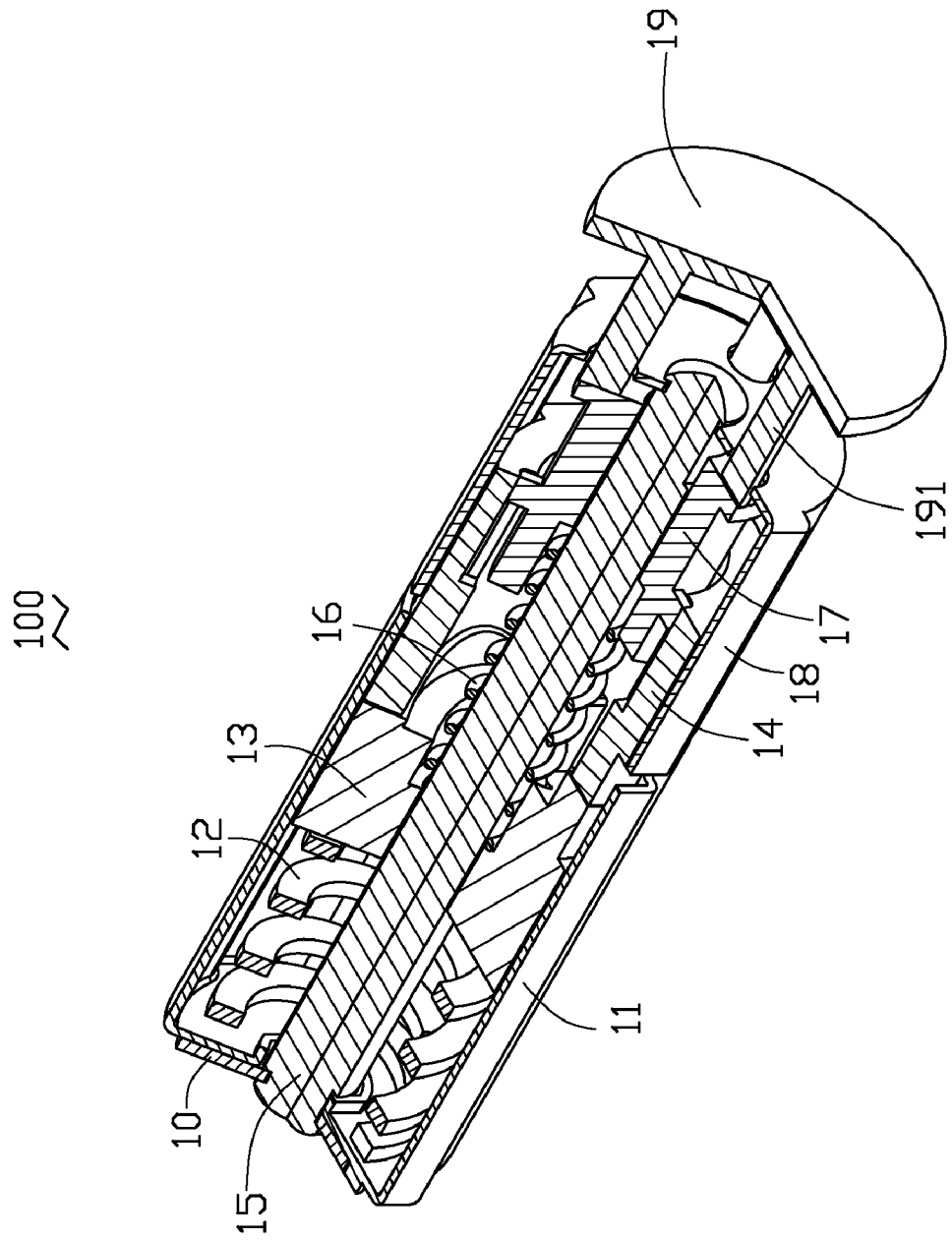
FIG. 9 is a cut-away view of FIG. 8.

In assembly, referring to FIGS. 7 to 9, one end of the shaft 15 firstly passes through the through hole 146 of the follower 14, the other end of the shaft 15 passes through the stepped hole 131, with the third cam surface 142 of the follower 14 engaging with the first cam surface 135 of the cam 13. The second spring 16 is placed around the shaft 15, and is received in the stepped hole 131, with one end of the second spring 16 resisting the stepped wall 1311. Then, the control member 17 is placed around the shaft 15. The positioning blocks 174 of the control member 17 slidably engage in the slots 145 of the follower 14 so that the control member 17 is locked with the follower 14. The other end of the second spring 16 is received in the stepped hole 173, and resists the stepped wall 1731. After that, the first spring 12 is placed around the shaft 15 adjacent to the cam 13. The sleeve 11 receives the first spring 12 and the cam 13. One end of the shaft 15 with the loop groove 151 is exposed from the square hole 115 of the partially-closed end of the sleeve 11. The washer 10 is locked in the loop groove 151. The protrusions 133 of the cam 13 are slidably received in the sleeve groove 114 of the sleeve 11.

The follower 14 with the control member 17 are together received in the receiving seat 18. The projections 144 are slidably received in the seat grooves 184 of the receiving seat 18. The latching portion 152 of the shaft 15 extends out from the central hole 185 of the receiving seat 18.

Finally, the arms 192 of the button 19 are inserted into the button holes 186 of the receiving seat 18, and the arms 192 of the button 19 axially resist the control member 17. Accordingly, the hinge assembly 100 is thus completely assembled.

If incorporated into a mobile phone during manufacture, the sleeve 11 can engage in a cavity (not shown) of the cover section 210 of the mobile phone 200, and the receiving seat 18 can connect with the body section 220 of the mobile phone 200. When the cover section 210 of the mobile phone 200 is in a fully open position, the peaks 1351 of the first cam surface 135 of the cam 13 resist the valley 1422 of the third cam surface 142. The first spring 12 exerts a predetermined pressure on the cam 13 and the follower 14. The second spring 16 exerts a predetermined pressure on the control member 17 so that the second cam surface 136 of the cam 13 is spaced from the fourth cam surface 171 of the control member 17. The flange 172 is also spaced from the end wall 143 of the follower 14.

When the cover section 210 of the mobile phone 200 is being closed, the cover section 210 can be closed by hand by pushing the sleeve 11 to rotate relative to the body section 220. The sleeve 11 further brings the cam 13 to rotate relative to the follower 14. The follower 14 limited by the receiving seat 18 cannot rotate. When the cam 13 rotates, the follower 14 is pushed to only slide along an axial direction toward the button 19. When the cam 13 passes over the peaks 1421 of the follower 14, the first spring 12 accumulates elastic potential energy. When it stops exerting force, the cam 13 automatically slides into the valleys 1423 of the follower 14 along the latching cam surface 142 of the follower 14. Accordingly, the cover section 210 becomes closed relative to the body section 220 of the mobile phone 200. The principles of the manual opening process are basically the same as the manual closing process.

When a user wants to automatically open the cover section 210 of the mobile phone 200 automatically, he/she may press the button 19. In this process, the button 19 moves along an axial direction of the shaft 15, the arms 192 of the button 19 then push the flange 172 of the control member 17 to move away from the button 19 in the axial direction of the shaft 15. The control member 17 moves axially until the fourth cam surface 171 of the control member 17 engages with the second cam surface 136, compressing the second spring 16 toward the cam 13. Because the control member 17 is locked with the receiving seat 18, the control member 17 cannot rotate relative to the receiving seat 18, the button 19 is further pressed to make the peaks 1711 of the fourth cam surface 171 push the rotation of the cam 13 until the peaks 1351 pass over the peaks 1421 of the follower 14. At that time, the button 19 is released. The elastic potential energy of the second spring 16 then pushes the control member 17 to move toward the button 19. Accordingly, the fourth cam surface 171 of the control member 17 is separated from the second cam surface 136 of the cam 13. Then, the first cam surface 135 of the cam 13 then rotates relative to the third cam surface 141 of the follower 14 under urging of the first spring 12. Furthermore, the cam 13 brings the sleeve 11 to rotate so that the cover section 210 of the mobile phone 200 is opened. The cam 13 stops rotating when the cover section 210 of the mobile phone 200 is completely opened. The hinge assembly 100 may be opened manually.

In an alternative embodiment, the first spring 12 and the second spring 16 may be replaced by other elastic elements such as an elastic sponge.

In an alternative embodiment, the configuration of the first cam surface 135 of the cam 13 may be different from the third cam surface 141 of the follower 14 as long as the first cam surfaces 135 do not interfere with the third cam surface 141 of the follower 14. Understandably, the second cam surface 136 of the cam 13 may be different from the fourth cam surface 171 of the control member 17 as long as the second cam surfaces 136 do not interfere with the fourth cam surface 1741 of the control member 17.

As described above, the present invention provides a hinge assembly 100 for use with various portable devices, beyond the mobile phone illustrated, and/or with other devices needing a hinge assembly that facilitates the achievement of fully open and fully closed positions.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A hinge assembly, comprising:
    A cam having a first cam surface and a second cam surface, the second cam surface integrally formed at an inner side periphery of the first cam surface;
    a follower having a third cam surface engaging with the first cam surface;
    a first spring providing an elastic force causing the first cam surface of the cam and the third cam surface of the follower to resist each other;
    a control member having a fourth cam surface engaging with the second cam surface of the cam; and
    a second spring positioned between the control member and the follower, the second spring pushing the control member to be separated from the second cam surface;
    wherein the control member is movable to cause the cam to rotate whereby the first cam surface rotates relative to the third cam surface of the follower.

2. The hinge assembly as claimed in claim 1, wherein the follower has an inner circumferential wall equally defining three spaced slots, and the control member forms three spaced positioning blocks slidably engaging in the slots.

3. The hinge assembly as claimed in claim 1, further comprising a button, wherein the button has at least one arm, the at least one arm resists the control member, the button being pressable to drive the control member to move away from the button to thereby allow the fourth cam surface to contact with the second cam surface of the cam.

4. The hinge assembly as claimed in claim 3, further comprising a receiving seat, wherein the receiving seat includes a partially-closed end defining a central hole and three button holes, the three button holes surround the central hole, the button includes three arms, and each arm is received in a corresponding button hole, the control member is received in the follower, the receiving seat receives the follower and the control member.

5. The hinge assembly as claimed in claim 4, further comprising a sleeve, wherein the sleeve includes an open end and a partially-closed end, the partially-closed end of the sleeve defines a square hole at a central area thereof, the first spring and the cam are received in the sleeve, and one end of the shaft extending from the square hole of the sleeve, the other end of the shaft extending from the central hole of the receiving seat.

6. The hinge assembly as claimed in claim 1, wherein the second cam surface of the cam and the fourth cam surface of the control member include two peaks and two valleys, and two vertical surfaces and two sloped surfaces are formed between one peak and one valley.

7. The hinge assembly as claimed in claim 1, wherein the control member moves to contact the second cam surface of the cam and pushes the cam to rotate until the first cam surface of the cam automatically rotates relative to the third cam surface of the follower.

8. The hinge assembly as claimed in claim 1, wherein the cam is annular, the second cam surface is closer to the center of the annular cam.

9. A hinge assembly of a foldable electronic device comprising a main body and a flip cover, the hinge assembly comprising:
    a cam having a first cam surface and a second cam surface, the second cam surface integrally formed at an inner side periphery of the first cam surface, the cam being configured so as to be fixed relative to one of the main body and the flip cover;
    a follower having a third cam surface engaging with the first cam surface, the follower configured so as to be fixed relative to the other of the main body and the flip cover;
    a first spring providing an elastic force causing the first cam surface of the cam and the third cam surface of the follower to resist each other;
    a control member having a fourth cam surface engaging with the second cam surface of the cam, the control member being movable axially between a first position where the fourth cam surface of the control member is engaged with the second cam surface of the cam in a manner so as to cause the cam to rotate relative to the follower, and a second position where the fourth cam surface of the control member is separated from the second cam surface of the cam; and
    a second spring positioned between the control member and the follower, the second spring pushing the control member to be separated from the second cam surface.

10. The hinge assembly as claimed in claim 9, wherein the follower has an inner circumferential wall equally defining three spaced slots, and the control member forms three spaced positioning blocks slidably engaging in the slots.

11. The hinge assembly as claimed in claim 9, further comprising a button, wherein the button has at least one arm, the at least one arm resists the control member, the button being pressable to drive the control member to move away from the button to thereby allow the fourth cam surface to contact with the second cam surface of the cam.

12. The hinge assembly as claimed in claim 11, further comprising a receiving seat, wherein the receiving seat includes a partially-closed end defining a central hole and three button holes, the three button holes surround the central hole, the button includes three arms, and each arm is received in a corresponding button hole, the control member is received in the follower, the receiving seat receives the follower and the control member.

13. The hinge assembly as claimed in claim 12, further comprising a sleeve, wherein the sleeve includes an open end and a partially-closed end, the partially-closed end of the sleeve defines a square hole at a central area thereof, the first spring and the cam are received in the sleeve, and one end of the shaft extending from the square hole of the sleeve, the other end of the shaft extending from the central hole of the receiving seat.

14. A foldable electronic device having a main body and a flip cover hinged together by a hinge assembly, the hinge assembly comprising:
    a shaft;
    a cam placed around the shaft, and the cam having a first cam surface and a second cam surface, the second cam surface integrally formed at an inner side periphery of the first cam surface, the cam being fixed with respect to the flip cover;

a follower placed around the shaft, and the follower having a third cam surface, the follower being fixed with respect to the main body;

a first spring providing an elastic force to make the first cam surface of the cam and the third cam surface of the follower resist each other;

a control member pivotably mounted around the shaft having a fourth cam surface, the control member being movable to push the cam to rotate to cause the first cam surface of the cam to rotate relative to the third cam surface of the follower; and a second spring positioned between the control member and the follower, the second spring pushing the control member to be separated from the second cam surface.

15. The foldable electronic device as claimed in claim 14, further comprising a button, wherein the button has at least one arm, the at least one arm resists the control member, the button being pressable to drive the control member to move away from the button to thereby allow the fourth cam surface to contact with the second cam surface of the cam.

16. The foldable electronic device as claimed in claim 15, further comprising a receiving seat, wherein the receiving seat includes a partially-closed end defining a central hole and three button holes, the three button holes surround the central hole, the button includes three arms, and each arm is received in a corresponding button hole, the control member is received in the follower, the receiving seat receives the follower and the control member.

* * * * *